United States Patent [19]

Jarman et al.

[11] 4,309,138
[45] Jan. 5, 1982

[54] FLOOR ANCHOR

[76] Inventors: Davis R. Jarman, 612 Ward Dr.; Virgil H. Hinson, 206 Fairway Oak, both of Brunswick, Ga. 31520

[21] Appl. No.: 119,825

[22] Filed: Feb. 8, 1980

[51] Int. Cl.³ .......................................... F16B 13/06
[52] U.S. Cl. ...................................... 411/55; 411/70; 254/93 R
[58] Field of Search ................. 85/75, 74, 73, 76, 77, 85/79, 78, 72, 62; 411/55, 70, 44

[56] References Cited

U.S. PATENT DOCUMENTS

| | | | |
|---|---|---|---|
| 4,137,816 | 2/1979 | Gartner | 85/74 X |
| 4,143,579 | 3/1979 | Ziaylek, Jr. | 85/73 X |

FOREIGN PATENT DOCUMENTS 682562 11/1952 United Kingdom .................... 85/75

*Primary Examiner*—Ramon S. Britts
*Attorney, Agent, or Firm*—Clarence A. O'Brien; Harvey B. Jacobson

[57] ABSTRACT

A sleeve is provided for snug reception through a bore in a floor slab and an elongated shank is provided for snug sliding reception through the sleeve with the opposite ends of the shank projecting outwardly from the corresponding ends of the sleeve. One end of the sleeve is provided with an enlargement thereon tapering toward the other end of the shank and the maximum diameter of the enlargement is less than the outside diameter of the sleeve. The enlargement includes a minor diameter end which may be wedgingly received within the adjacent end of the sleeve and the enlargement includes circumferentially spaced, radially outwardly tapering and longitudinally extending flutes formed thereon. The flutes are spiraled, slightly, about the enlargement and are inclined less than 30° relative to the longitudinal axis of the shank. Forced structure is provided for operative connection between the shank and the sleeve to longitudinally displace of the former relative to the latter in a direction wedging the enlargement into the adjacent end of the sleeve and the force structure is operative to apply torque to the shank in response to longitudinal displacement thereof relative to the sleeve tending to rotate the shank in the same direction in which the flutes are spiraled.

2 Claims, 6 Drawing Figures

FLOOR ANCHOR

BACKGROUND OF THE INVENTION

Various forms of floor anchors have been heretofore provided, but most are difficult to install and may become loosened in response to heavy forces being repeatedly applied thereto. Examples of previously known forms of floor anchors and similar structures including some of the general structural and operational features of the instant invention are disposed in U.S. Pat. Nos. 2,343,283, 3,216,304, 3,457,767, 3,657,956, 3,990,207 and 4,070,834.

Accordingly, a need exists for an improved form of floor anchor which may be readily applied to a concrete slab and which will have little tendency of being loosened as a result of heavy forces being repeatedly applied thereto. Also, a need exists for a floor anchor which may be conveniently tightened in the event any loosening of the floor anchor should occur.

The main object of this invention is to provide an improved floor anchor and force structure for installing the floor anchor in a floor slab.

Another object of this invention is to provide an improved floor anchor including relatively simple structure and which will be effective to supply a rigid dependable anchor in a concrete slab.

Yet another important object of this invention is to provide a floor anchor which may be utilized in conjunction with floor slabs of different thickness, the two components of the floor anchor being readily cut to proper length.

Another object of this invention is to provide a floor anchor installing structure in accordance with the preceding objects and which may utilize a conventional upright hydraulic jack in applying the necessary force to properly install the floor anchor.

A final object of this invention to be specifically enumerated herein is to provide a floor anchor which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
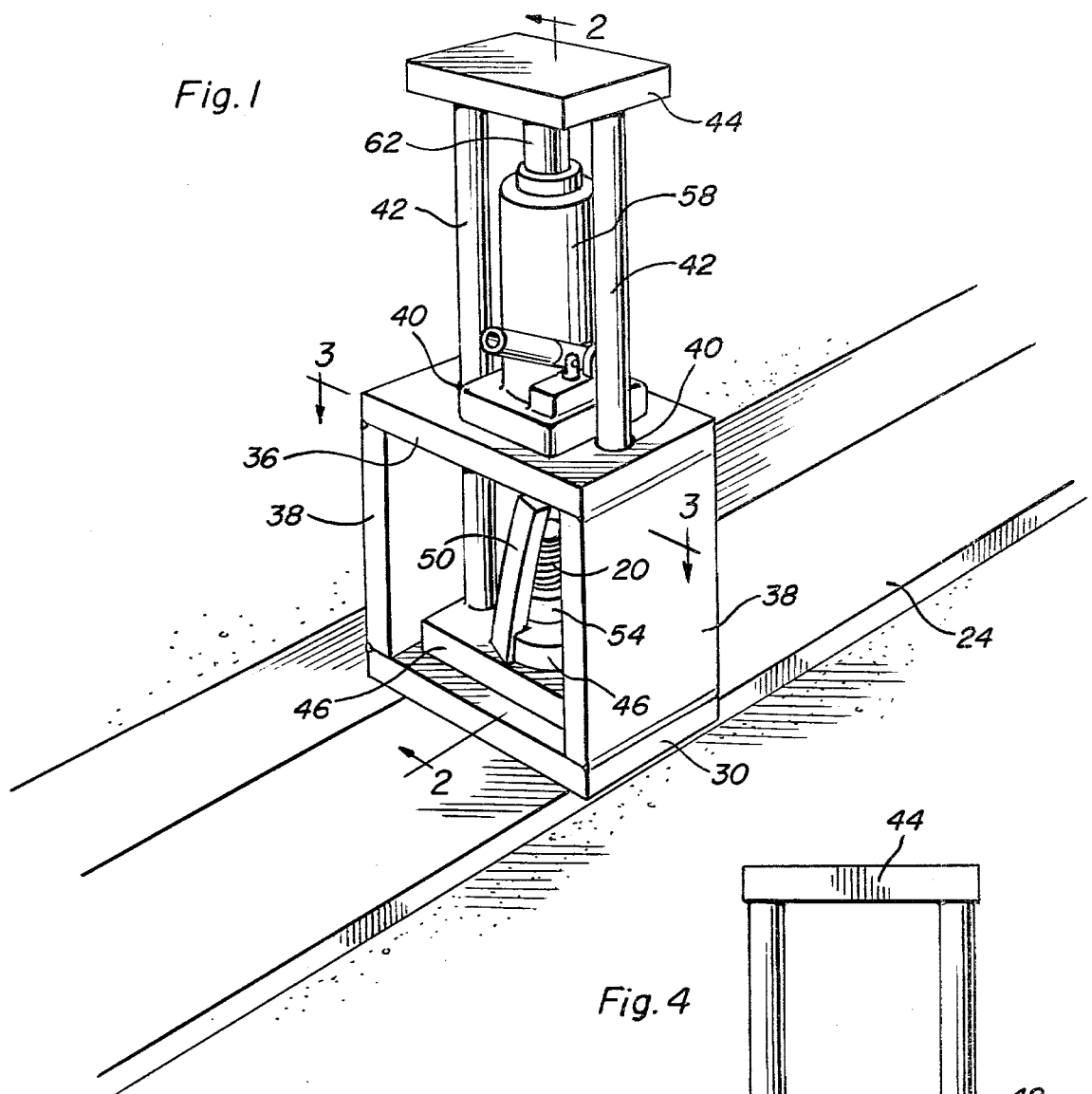
FIG. 1 is a perspective view illustrating the manner in which a floor anchor constructed in accordance with the present invention may be installed in a floor slab.
Figure 4:
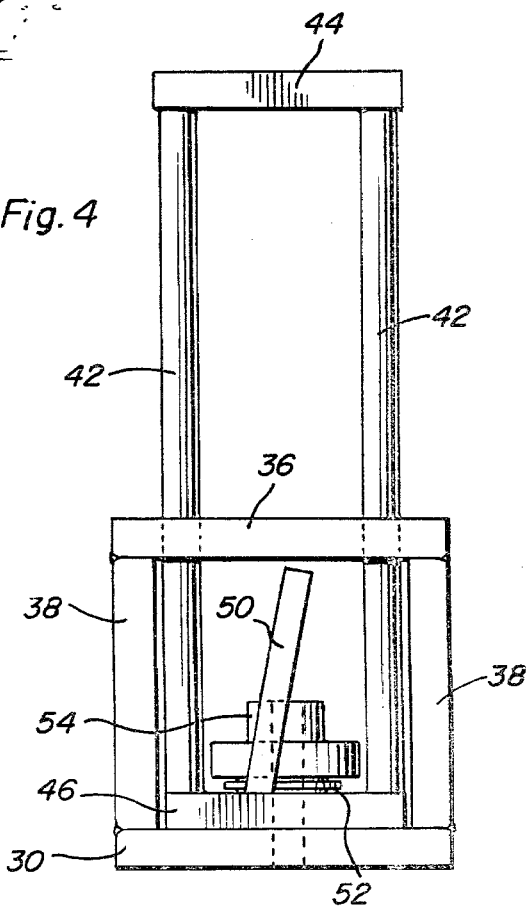
FIG. 4 is a front elevational view of the floor anchor installing apparatus.
Figure 5:
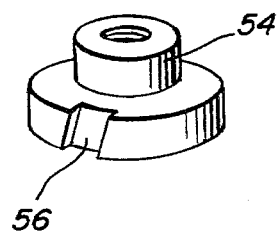
FIG. 5 is a perspective view of the torque applying thrust member of the anchor installing apparatus.

Referring now more specifically to the drawings, the numeral 10 designates a concrete floor slab having a pre-formed vertical bore 12 formed therethrough. A slab anchor construction in accordance with the present invention is referred to in general by the reference numeral 14 and a force generating structure for installing the anchor construction is referred to in general by the reference numeral 16.

The anchor construction 14 includes an elongated cylindrical sleeve 18 and an elongated cylindrical shank 20. The sleeve 18 is slightly longer than the bore 12 and the shank 20 is appreciably longer than the sleeve 18. One end of the shank 20 includes an enlargement 22 thereon tapering toward the other shank end and including circumferentially spaced longitudinally extending and radially outwardly tapering flutes 24 thereon. The flutes 24 are spiraled about the enlargement 22, but are inclined less than 30° relative to the longitudinal center line of the shank 20. An elongated track 24 is provided for anchoring frame-straightening equipment to the slab 10 and the track 24 includes a plurality of longitudinally spaced depending spacing sleeves 26 supported therefrom and a plurality of bores 28 formed therethrough coaxial with the sleeves 26.

The force generating structure 16 includes a frame consisting of a base plate 30 having a notch 32 formed therein opening laterally outwardly of one longitudinal edge 34 of the plate 30 and a top plate 36 supported from the base plate 30 by a pair of upstanding opposite side plate 38 extending between and welded to the plates 30 and 36. The top plate 36 has a pair of upstanding bores 40 formed therethrough and a pair of guide shafts 42 are slidably received through the bores 40 and are interconnected at their upper ends above the top plate 36 by an upper plate 44 to which the upper ends of the guide shafts are secured by welding. The lower ends of the guide shafts 42 are interconnected by a horizontal thrust plate 46 extending between and anchored by welding to the lower ends of the shafts 42 and the thrust plate 46 includes a notch 48 registered with the notch 32. Also, the force plate 46 includes a peripherally mounted upstanding spiral guide 50 for a purpose to be hereinafter more fully set forth.

A thrust bearing assembly 52 is disposed about the upper end of the shank 20 above the plates 30 and 46, the shank 20 extending upwardly through the inner ends of the notches 32 and 48 and a thrust nut 54 is threaded on the upper end of the shank 20 above the thrust bearing assembly 52 and includes a peripheral notch 56 in which the spiral guide 50 is slidingly received. Also, a standard upright hydraulic jack 58 has its base 60 supported from the upper surface of the top plate 36 and the upper end of its piston portion 62 abutted against the underside of the upper plate 44.

Figure 2:
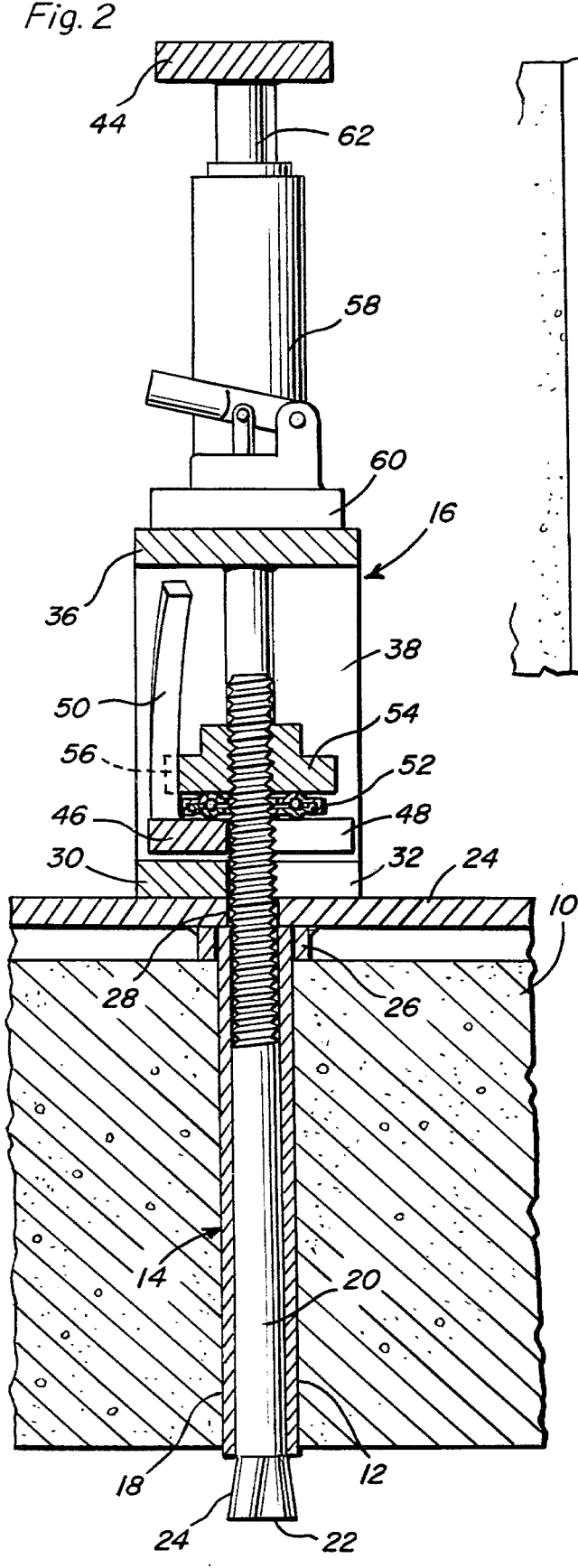
FIG. 2 is an enlarged fragmentary vertical sectional view taken substantially upon the plane indicated by the section line 2—2 of FIG. 1.
Figure 3:
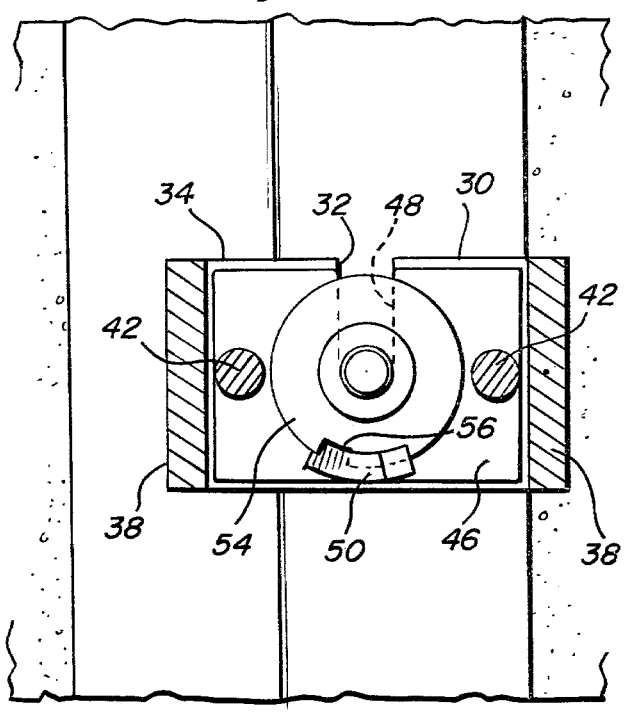
FIG. 3 is an enlarged fragmentary horizontal sectional view taken substantially upon the plane indicated by the section line 3—3 of FIG. 1.
Figure 6:
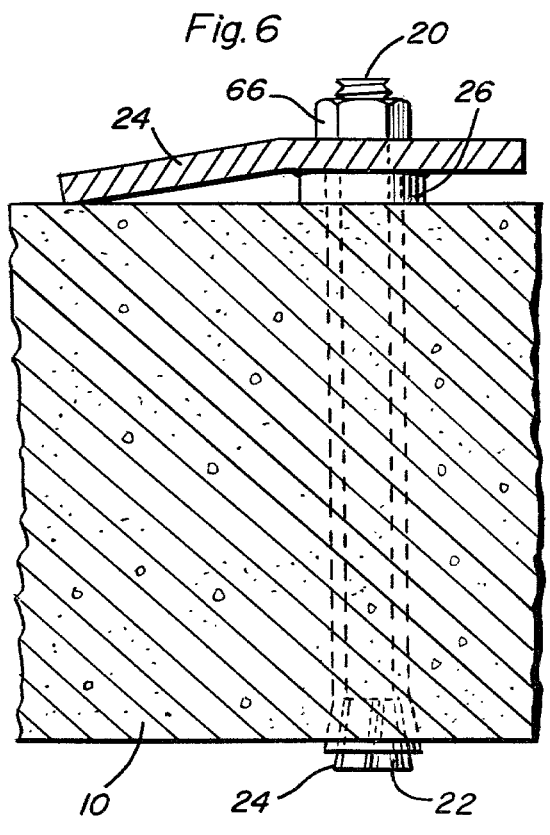
FIG. 6 is a fragmentary vertical sectional view illustrating the floor anchor in a fully installed condition.

In installation, the bore 12 is initially formed through the concrete slab 10 and thereafter the shank 20 is positioned in the sleeve 18 in the manner illustrated in FIG. 2 of the drawings and the sleeve 18 and shank 20 are displaced downwardly through the bore 12 to the position thereof illustrated in FIG. 2. Thereafter, the track 24 may be placed in position over the upper threaded end of the shank 20 and the force generating structure 16 may be operatively associated with the threaded upper end of the shank 20 in the manner illustrated in FIG. 2. Then, upon actuation of the hydraulic jack 58 to raise the force plate 46, the thrust bearing assembly 52 and the thrust nut 54, the shank 20 will be upwardly displaced relative to the sleeve 18, the track 24 abutting against the upper end of the sleeve 18 about the bore 28 to prevent upward movement of the sleeve 18, and the enlargement 22 will be drawn into the lower end of the sleeve 18 in order to expand the latter into tight frictional engagement with the slab 10. As the enlargement 22 is drawn into the lower end of the sleeve 18, the flutes 24 on the enlargement 22 will tend to cut into the sleeve 18 and to therefore key the shank 20 to the sleeve 18. Further, the flutes 24 will cause the lower end of the sleeve 18 to be more prominently expanded in the areas thereof contacted by the flutes 24 and will thus cause the sleeve 18 to be keyed in the bore 12. As the force plate 46 moves upwardly and carries the thrust bearing assembly 52 and thrust nut 54 therewith, the thrust nut 54 is slightly rotated by its keyed engagement with the spiral guide 50 and therefore tends to rotate the shank 20 in the direction in which the flutes 24 are spiraled due to the frictional engagement between the thrust nut 54 and the threads on the shank 20, the axial to angular displacement ratio of the thrust nut 54 relative to the sleeve being greater than the corresponding ratio determined by the threaded engagement of the nut relative to the shank. Therefore, the flutes 24 tend to spiral themselves into the lower end of the sleeve 18. After the shank 20 has been upwardly displaced to the position thereof illustrated in FIG. 6 of the drawings in order to key the shank 20 relative to the sleeve 18 and the sleeve 18 relative to the slab 10, the force generating structure 16 is removed and an anchor nut 66 is threaded on the threaded upper end of the shank 20 in lieu of the thrust nut 54 and the excess upper end of the shank 20 is cut away. In this manner, the track 24 is securely anchored to the slab 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A floor anchor assembly for anchoring through a floor slab having a bore formed therethrough, said anchor assembly including a sleeve for snug reception through said bore, an elongated shank having first and second ends, said first end including a tapered enlargement thereon tapering toward said second end and being of a maximum diameter less than the outside diameter of said sleeve, said second end having external threads thereon, said shank exclusive of said enlargement, being freely slidable through said sleeve and of a length greater than said sleeve, the minor diameter end of said enlargement being wedgedly receivable within the adjacent end of said sleeve when said shank extends therethrough, said shank and sleeve being adapted to have force means operatively connected therewith for axially displacing said shank relative to said sleeve in a direction to wedge said enlargement in and radially expand said adjacent sleeve end, said enlargement including circumferentially spaced, radially outwardly tapering and longitudinally extending flutes formed thereon, said flutes extending in a spiral manner about said enlargement and being inclined less than 30° relative to the longitudinal center line of said shank, force generating structure operatively connected between said sleeve and shank operative to exert an axial force on said shank to shift the latter relative to said sleeve in a direction advancing said other end of said shank, said force generating structure including means for applying rotational torque to said shank in the direction in which said flutes are spiraled for advancement thereof into said adjacent end of said sleeve, said means for applying rotational torque to said shank including a thrust nut threadedly engaged with said shank and means for axially displacing and rotating said thrust nut proportionately to longitudinal shifting of said shank relative to said sleeve and with the axial to angular displacement ratio of said nut relative to said sleeve being greater than the corresponding ratio determined by the threaded engagement of said nut with said shank.

2. The combination of claim 1 wherein said flutes equal four in number.

* * * * *